United States Patent
Gilbert

(10) Patent No.: US 11,891,166 B2
(45) Date of Patent: Feb. 6, 2024

(54) HYBRID MULTIROTOR VEHICLES AND RELATED METHODS

(71) Applicant: The Boeing Company, Arlington, VA (US)

(72) Inventor: Eric Benjamin Gilbert, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 307 days.

(21) Appl. No.: 16/382,838

(22) Filed: Apr. 12, 2019

(65) Prior Publication Data

US 2020/0324886 A1 Oct. 15, 2020

(51) Int. Cl.
*B64C 27/28* (2006.01)
*B64C 27/08* (2023.01)
*B64C 27/52* (2006.01)
*B64D 27/24* (2006.01)
(Continued)

(52) U.S. Cl.
CPC .............. *B64C 27/28* (2013.01); *B64C 27/08* (2013.01); *B64C 27/52* (2013.01); *B64D 27/24* (2013.01); *B64D 31/00* (2013.01); *B64C 29/0033* (2013.01)

(58) Field of Classification Search
CPC ......... B64C 27/28; B64C 27/08; B64C 29/00; B64C 27/22; B64C 27/025; B64C 27/026; B64D 27/24
See application file for complete search history.

(56) References Cited

U.S. PATENT DOCUMENTS

2012/0119016 A1 5/2012 Shaw
2013/0062455 A1* 3/2013 Lugg ...................... B64C 39/12
244/12.3
(Continued)

FOREIGN PATENT DOCUMENTS

| RU | 2548304 | 4/2015 |
| RU | 2648503 | 3/2018 |
| RU | 2650257 | 4/2018 |

OTHER PUBLICATIONS

Webpage for Opener. Inc., available at https://www.opener.aero/ (last accessed Apr. 12, 2019), 11 pages.
(Continued)

*Primary Examiner* — Philip J Bonzell
*Assistant Examiner* — Ashesh Dangol
(74) *Attorney, Agent, or Firm* — Hanley, Flight & Zimmerman, LLC

(57) ABSTRACT

Hybrid multirotor vehicles and related methods are disclosed herein. An example aircraft includes a battery, a rotor coupled to a wing, a motor operatively coupled to the rotor, and a processor operatively coupled to the motor. The processor to is cause the motor to operate in a first motor operational state. The rotor is to operate in a first rotor operational state when the motor is operating in the first motor operational state. The processor is to cause the motor to switch from operating in the first motor operational state to a second motor operational state. The rotor is to operate in a second rotor operational state when the motor is in the second motor operational state. The motor is to provide electrical energy to the battery in the second motor operational state and the rotor is to autorotate in the second rotor operational state.

23 Claims, 8 Drawing Sheets

(51) Int. Cl.
B64D 31/00 (2006.01)
B64C 29/00 (2006.01)

(56) References Cited

U.S. PATENT DOCUMENTS

| | | | | |
|---|---|---|---|---|
| 2016/0052626 | A1* | 2/2016 | Vander Mey | B64C 27/20 |
| | | | | 244/6 |
| 2016/0368600 | A1* | 12/2016 | Frolov | B64C 39/10 |
| 2019/0161179 | A1* | 5/2019 | Uebori | B64C 27/605 |
| 2020/0156801 | A1* | 5/2020 | Tamada | B64C 27/14 |

OTHER PUBLICATIONS

European Patent Office, "Extended European Search Report," issued in connection with European Patent Application No. 20168445.3, dated Oct. 27, 2020, 15 pages.
Cirrus Aircraft, "Vision Jet the Next Evolution is Here," website, 2023, retrieved on Aug. 30, 2023 from <https://cirrusaircraft.com/aircraft/vision-jet/>, 16 pages.
Cirrus Aircraft, "Vision Jet," Brochure, 2023, retrieved on Aug. 30, 2023 from <https://cirrusaircraft.com/aircraft/vision-jet/>, 11 pages.

* cited by examiner

HYBRID MULTIROTOR VEHICLES AND RELATED METHODS

FIELD OF THE DISCLOSURE

This disclosure relates generally to air vehicles and, more particularly, to hybrid multirotor vehicles and related methods.

BACKGROUND

Some multirotor aircraft, such as a quadrotor, are electric vehicles including batteries that are used to power the vehicle. Operation of the vehicle, such as a distance over which the vehicle can fly, can vary based on battery capacity. Regenerative braking provides a means for charging batteries of a vehicle during operation of the vehicle. In particular, in regenerative braking, a motor converts mechanical energy to electrical energy that is provided to the batteries.

SUMMARY

An example aircraft includes a frame including a wing, a battery carried by the frame, a rotor coupled to the wing, a motor operatively coupled to the rotor, and a processor operatively coupled to the motor. The processor is to cause the motor to operate in a first motor operational state, the rotor to operate in a first rotor operational state when the motor is operating in the first motor operational state and cause the motor to switch from operating in the first motor operational state to a second motor operational state. The rotor is to operate in a second rotor operational state when the motor is in operating in the second motor operational state. The motor to provide electrical energy to the battery in the second motor operational state and the rotor to autorotate in the second rotor operational state during flight of the aircraft.

Another example aircraft includes a first rotor coupled to a first wing of the aircraft. The first rotor is to autorotate during flight of the aircraft. The example aircraft includes a first motor operatively coupled to the first rotor. The example aircraft includes a second rotor coupled to a second wing of the aircraft. The second rotor is to autorotate during flight of the aircraft. The example aircraft includes a second motor operatively coupled to the second rotor. The example aircraft includes a rotor operation manager to cause the first motor to electrically control a rotational speed of the first rotor when the first rotor is autorotating and cause the second motor to electrically control a rotational speed of the second rotor when the second rotor is autorotating.

Another example aircraft includes a first rotor, a second rotor, means for providing thrust, and first means for generating power. The first means for generating power is to selectively control a rotational speed of the first rotor. The example aircraft includes second means for generating power. The second means for generating power is to selectively control a rotational speed of the second rotor. The means for providing thrust, the first means for generating power, and the second means for generating power are to adjust rotation of the aircraft relative to one or more axes.

Another example aircraft includes a frame including a wing, a battery carried by the frame, a rotor coupled to the wing, a motor operatively coupled to the rotor, and a processor operatively coupled to the motor. The processor is to cause the motor to cause rotation of the rotor during first time period of flight of the aircraft and cause the motor to one of free spin or provide electrical energy to the battery during a second time period of flight of the aircraft different from the first time period.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Figure 1:
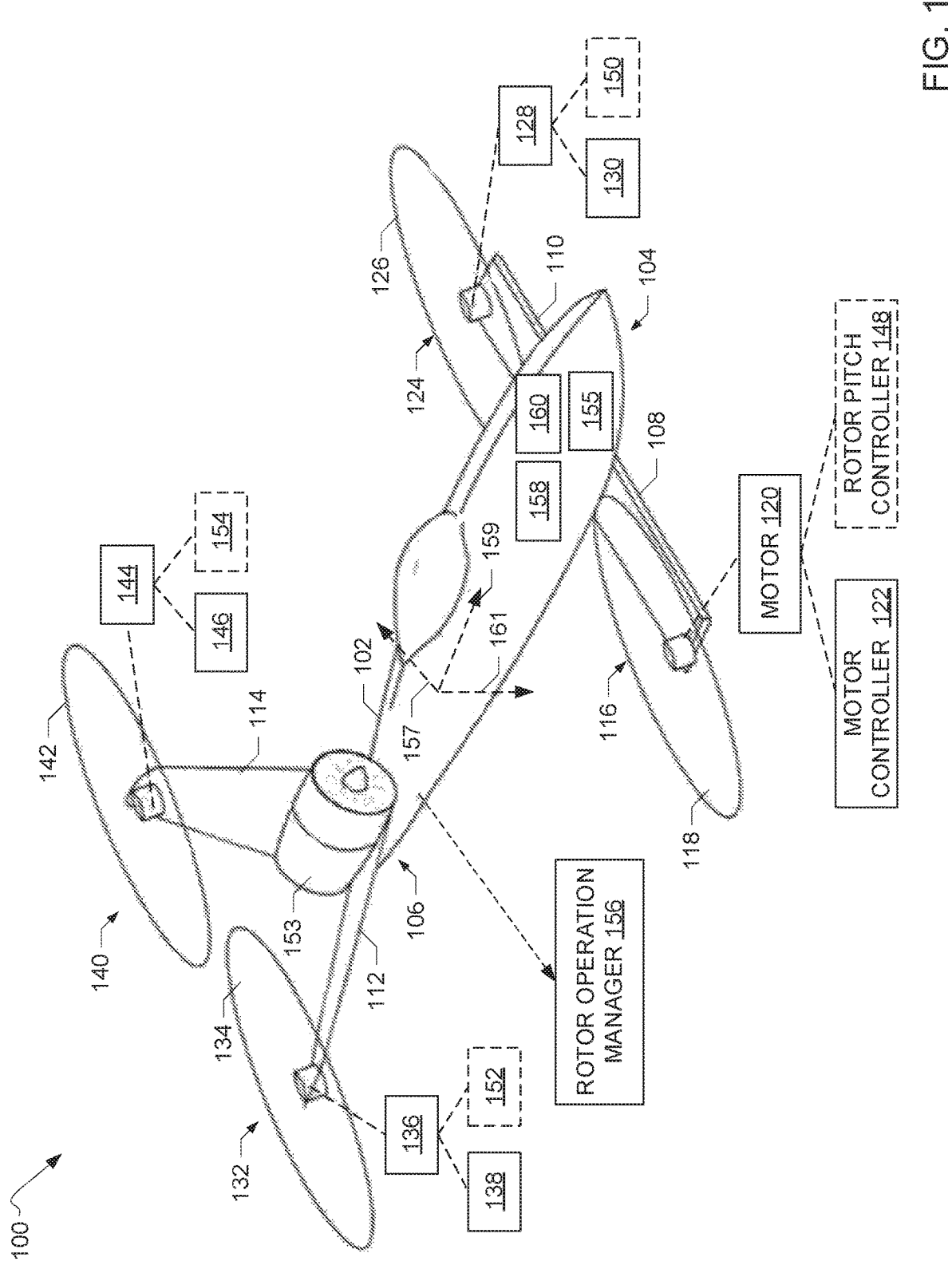
FIG. 1 illustrates an example multirotor vehicle including a rotor operation manager to selectively control operation of rotors of the vehicle in accordance with teachings of this disclosure.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

An electric multirotor vehicle such as a quadrotor that is powered by batteries aboard the vehicle can provide for improved maneuverability of the vehicle while reducing environmental impact from operation of the vehicle. However, an electric multirotor aircraft is often restricted with respect to distance over which the aircraft can fly due to limited capacity of the batteries, which become depleted during flight. Adding a generator (e.g., gas-powered generator) to charge the batteries during flight increases a weight of the vehicle and, thus, can affect an efficiency of the vehicle.

Disclosed herein are example hybrid multirotor vehicles including a fuel-burning thruster and rotors coupled to fixed wings of the vehicle. Example hybrid multirotor vehicles disclosed herein include electric motors to control operation of the rotors of the aircraft with respect, for example, to rotational speed of the rotors. Examples disclosed herein include a rotor operation manager to selectively control operation of the electric motors to cause the motors to operate in a first motor operational mode in which the electric motors drive rotation of the rotors or a second motor operational mode in which the motors control the rotational speed of the rotors via regenerative braking. In examples disclosed herein, electrical energy generated via the electric motors when operating in the second motor operational mode is used to charge the batteries of the vehicle. The batteries of the vehicle can be used to power the vehicle during takeoff (e.g., vertical takeoff) and/or landing, or and/or can serve as a backup power source during, for instance, engine failure. Because the electric motors serve as means for generating power that is used to charge the batteries during flight, a distance over which the vehicle can fly can be increased without concerns of the batteries being depleted during flight. Also, a size of the batteries can be reduced as compared to vehicles that do not includes means for charging the batteries during flight. Further, the weight of the aircraft is further minimized by the dual use of the motors of the rotors, which serve to drive the rotors and generate electrical energy for the batteries. Thus, the contribution of the motors to the weight of multirotor aircraft is offset by the dual use of the motors during fight of the aircraft.

In some examples disclosed herein, the rotor operation manager instructs the motors to operate in the second operational mode when the vehicle is a cruise stage of flight. In such examples, the rotors of the vehicle autorotate, or rotate as a result of air passing through blades of the rotor (e.g., as in an autogyro). The example rotor operation manager selectively instructs the motors associated with the respective rotors to increase drag forces on the autorotating rotors, thereby reducing a rotational speed of the rotors. Electricity generated by the motors when reducing the rotational speed of the rotors is used to charge the batteries of the vehicle via regenerative braking. In examples disclosed herein, the rotor operation manager selectively instructs one or more of the motors to increase the drag forces on the respective rotor(s) to control yaw, pitch, or roll of the vehicle during flight. In some such examples, the fuel burning thruster is positioned such that a thrust vector associated with the thruster is substantially centered between two or more of the rotors. In such examples, the rotor operation manager balances the drag forces associated with the rotors against the thrust vector associated with the thruster.

In some examples, the rotors of the vehicle are variable pitch rotors. In such examples, the rotor operation manager can selectively adjust a pitch angle of the blades of the rotor(s) to, for example, increase a speed of the aircraft during the cruise stage. Thus, examples disclosed herein provide for efficient operation of the multirotor vehicle during flight to extend the flying capabilities of the vehicle.

FIG. 1 illustrates an example multirotor vehicle or aircraft 100 in accordance with teachings of this disclosure. The example multirotor aircraft 100 includes a frame 102 having a first end 104 and a second end 106 opposite the first end 104. A first wing 108 and a second wing 110 are coupled to the first end 104 of the frame 102 and a third wing 112 and a fourth wing 114 are coupled to a second end 106 of the frame 102. Thus, the example of aircraft 100 of FIG. 1 includes components or features of a fixed-wing aircraft. In some examples, the aircraft 100 is a passenger aircraft.

In the example of FIG. 1, a first rotor 116 including one or more blades 118 is coupled to the first wing 108. The first rotor 116 can include a fixed pitch rotor. In some examples, the first rotor 116 is a variable pitch rotor in which a pitch angle of the blades 118 of the first rotor 116 can be adjusted. The first rotor 116 includes a first motor 120 to control, for example, a speed at which the blades 118 rotate. In the example of FIG. 1, the first motor 120 is an electric motor. In FIG. 1, the first motor 120 is communicatively coupled to a first motor controller 122 (e.g., a processor), which generates instructions to control operation of the first motor 120.

The example multirotor aircraft 100 of FIG. 1 includes a second rotor 124 that is coupled to the second wing 110 and includes blades 126. The second rotor 124 includes a second electric motor 128 to control rotation of the blades 126. The example multirotor aircraft 100 includes a second motor controller 130 in communication with the second motor 128 to control operation of the second motor 128.

Similarly, the example multirotor aircraft 100 of FIG. 1 includes a third rotor 132 coupled to the third wing 112 and having blade(s) 134, a third electric motor 136 to control the blades 134, and a third motor controller 138 in communication with the third motor 136. The example multirotor aircraft 100 of FIG. 1 includes a fourth rotor 140 coupled to the fourth wing 114 and having blade(s) 142, a fourth electric motor 144 to control the blades 142, and a fourth motor controller 146 in communication with the fourth motor 144. Thus, the example aircraft 100 includes features or components of a quadrotor. However, the example aircraft 100 can include additional or fewer rotors 116, 124, 132, 140 than shown in FIG. 1.

In some examples, each of the first, second, third, and fourth rotors 116, 124, 132, 140 includes the same number and/or type (e.g., size) of blades 118, 126, 134, 142. In some other examples, the size and/or type of blades 118, 126, 134, 142 differ between two or more of the rotors 116, 124, 132, 140. Also, in some examples, the first, second, third, and fourth rotors 116, 124, 132, 140 are fixed pitch rotors. In other examples, the first, second, third, and fourth rotors 116, 124, 132, 140 are variable pitch rotors, or rotors in which the pitch angle of the respective blades 118, 126, 134, 142 can be adjusted. In examples in which the rotors 116, 124, 132, 140 include variable pitch rotors, the example rotors 116, 124, 132, 140 include respective first, second, third, and fourth rotor pitch controllers 148, 150, 152, 154 to generate instructions that control the pitch angle(s) of the blades 118, 126, 134, 142 of the rotors 116, 124, 132, 140. The firth, second, third, and fourth rotor pitch controllers 148, 150, 152, 154 are in communication with the corresponding first, second, third, and fourth motors 120, 128, 136, 144.

The wings 108, 110, 112, 114 and the rotors 116, 124, 132, 140 of the multirotor aircraft 100 provide lift for the vehicle during flight. The example multirotor aircraft 100 of FIG. 1 also includes a fuel-burning thruster 153. Thus, the aircraft 100 is a hybrid multirotor vehicle including the fuel-burning thruster 153 and electric motors 120, 128, 136, 144. In the example of FIG. 1, the thruster 153 is disposed between the third and fourth wings 112, 114. The example thruster 153 of the aircraft 100 of FIG. 1 provides horizontal thrust for the aircraft 100 during flight. In FIG. 1, the thruster 153 is positioned relative to the frame 102 of the aircraft 100 such that a horizontal thrust vector associated with the thruster 153 is substantially centered (e.g., horizontally and vertically centered) between the first, second, third, and fourth rotors 116, 124, 132, 140. However, the thruster 153 could be positioned differently relative to the frame 102 than shown in FIG. 1. In some examples, the thruster 153 is a pusher-type thruster. In other examples, the thruster 153 is a puller-type thruster.

The example multirotor aircraft 100 of FIG. 1 includes one or more batteries 155. In the example of FIG. 1, the batteries 155 can be used to power the aircraft 100 during one or more phases of flight. For instance, the batteries 155 can be used to power the aircraft 100 during vertical takeoff in which the rotors 116, 124, 132, 140 are driven by the motors 120, 128, 136, 144 to rotate and generate lift for the vehicle. Additionally or alternatively, the batteries 155 may be used to power the aircraft 100 during short-range flights and/or during landing. In some examples, the batteries 155 are used to power the aircraft 100 in the event of, for instance, failure of the thruster 153.

The example multirotor vehicle 100 of FIG. 1 includes a rotor operation manager 156 to control operation of the rotors 116, 124, 132, 140. The rotor operation manager 156 can be implemented by one or more processors of the multirotor vehicle 100. In the example of FIG. 1, each of the first, second, third, and fourth motor controllers 122, 130, 138, 146 is communicatively coupled to the rotor operation manager 156 via one or more wired or wireless connections.

The example rotor operation manager 156 of FIG. 1 generates instructions to selectively control operation of the first, second, third, and fourth motors 120, 128, 136, 144 and, thus, the respective rotors 116, 124, 132, 140 associated with the motors. For example, the rotor operation manager 156 can generate instructions for the motor(s) 120, 128, 136, 144 to operate in a first motor operational state in which motors(s) 120, 128, 136, 144 convert electrical energy into mechanical energy to cause the blades 118, 126 134, 142 of the rotors 116, 124, 132, 140 to rotate. The example rotor operation manager 156 can generate instructions for the motor(s) 120, 128, 136, 144 to operate in the first motor operational state to drive rotation of the rotors 116, 124, 132, 140 during, for example, vertical takeoff of the aircraft 100. When the motor drives the blades 118, 126 134, 142, the rotors 116, 124, 132, 140 can be considered to operate in a first rotor operational state.

During flight of the aircraft, such as during a cruise stage of aircraft 100, the example rotor operation manager 156 of FIG. 1 generates instructions for the blades 118, 126 134, 142 of the rotors 116, 124, 132, 140 to autorotate (e.g., by instructing the motor(s) 120, 128, 136, 144 to turn off or temporarily refrain from driving the rotation of the blades 118, 126 134, 142). Thus, during at least some portion of the flight of the aircraft 100, the rotors 116, 124, 132, 140 operate in a second rotor operational state in which the rotation of the blades 118, 126 134, 142 of the rotors 116, 124, 132, 140 is driven by the airstream. When the blades 118, 126 134, 142 of the rotors 116, 124, 132, 140 are autorotating, the example rotor operation manager 156 generates instructions for the motor(s) 120, 128, 136, 144 to operate in a second motor operational state in which one or more of the motors 120, 128, 136, 144 reduces a rotational speed (e.g., revolutions per minute (RPM)) of the corresponding rotor 116, 124, 132, 140 via regenerative braking. In particular, the rotor operation manager 156 instructs the motor(s) 120, 128, 136, 144, via the motor controller(s) 122, 130, 138, 146 to increases drag forces on to the rotors 116, 124, 132, 140 via, for example, generation of a braking torque on the respective shafts of the rotors (e.g., a negative drive shaft torque). As a result, the rotational speed of the rotor(s) 116, 124, 132, 140 decreases. Also, the electrical energy generated by the motor(s) 120, 128, 136, 144 while operating in the second motor operational state can be provided to the batteries 155 to charge the batteries 155 during flight. Thus, in the second motor operational state, the motor(s) 120, 128, 136, 144 act as electrical generators for the batteries 155.

In the example of FIG. 1, the rotor operation manager 156 selectively instructs one or more of the motor(s) 120, 128, 136, 144 to reduce rotational speed of the corresponding rotor(s) 116, 124, 132, 140 to control pitch, yaw, or roll of the aircraft 100. The example multirotor aircraft 100 includes one or more sensors 158 to generate data that is used by the rotor operation manager 156 to control the motor(s) 120, 128, 136, 144 in the second motor operational state and, thus, the movement of the aircraft 100 relative to a pitch axis 157, a roll axis 159, and/or a yaw axis 161. The sensors 158 can include, for instance, accelerometers (e.g., 3-axis accelerometers) and gyroscope(s) (e.g., 3-axis gyroscopes. In some examples, the sensor(s) 158 include sensors to measure thrust generated by the thruster 153 (e.g., strain gauges).

The rotor operation manager 156 can also receive input(s) from one or more vehicle management control system(s) 160 of the aircraft 100. The vehicle management control system(s) 160 can include sensor(s), processor(s), etc. that are used to monitor and/or control one or more components of the aircraft 100, such as landing gear of the aircraft 100. In some examples, the rotor operation manager 156 receives data from the vehicle management control system(s) 160 indicating changes in, for example, altitude, heading, and/or speed of the aircraft 100. The data transmitted to the rotor operation manager 156 by the vehicle management control system(s) 160 can be based on user input(s).

The example rotor operation manager 156 uses the data from the sensor(s) 158 and/or the vehicle management control system(s) 160 to generate instructions for the electric motor(s) 120, 128, 136, 144. For example, based on the altitude data from the vehicle management control system(s) 160, the rotor operation manager 156 detects that the aircraft 100 is entering the cruise stage. In such examples, the rotor operation manager 156 generates instructions for the rotors 116, 124, 132, 140 autorotate and the motor(s) 120, 128, 136, 144 to transition or switch from operating in the first motor operational state to the second motor operational state. As another example, when the motors 120, 128, 136, 144 are operating the second motor operational state, the rotor operational manager 156 can generate instructions for one or more of the motors 120, 128, 136, 144 to increase drag forces on the corresponding rotor(s) 116, 124, 132, 140 to reduce rotational speed based on sensor data from the sensor(s) 158 indicating rotation of the aircraft with respect to pitch, roll, or yaw axes 157, 159, 161. In some examples, the rotor operational manager 156 selectively instructs one or more of the motors 120, 128, 136, 144 to reduce rotational speed of the corresponding autorotating rotor(s) 116, 124, 132, 140 to balance the drag forces on the rotor(s) 116, 124, 132, 140 relative to the thrust generated by the thruster 153. In particular, when the rotors are autorotating, the force vectors associated with the rotors are treated as drag force vectors (as compared to lift force vectors during vertical takeoff). The rotor operational manager 156 balances the rotor drag forces against the thrust vector associated with the thruster 153.

Based on the data from the sensor(s) 158 and/or data from the vehicle management control system(s) 160, the rotor operation manager 156 generates instructions for the motor(s) 120, 128, 136, 144 to reduce the rotational speed of the rotor(s) 116, 124, 132, 140, thereby increasing drag on each rotor 116, 124, 132, 140 to control pitch, roll, and/or yaw of the aircraft 100. As disclosed above, in some examples, the rotor(s) 116, 124, 132, 140 are variable pitch rotors, or rotors in which a pitch angle of the blades of the rotors can be adjusted. In such examples, the rotor operation manager 156 generates instructions for one or more of the rotor pitch controller(s) 148, 150, 152, 154 to define pitch angles of the blades 118, 126 134, 142 of the respective rotors 116, 124, 132, 140 in communication with the rotor pitch controllers 148, 150, 152, 154. By adjusting the pitch angles of the blades 118, 126 134, 142, the drag on each rotor 116, 124, 132, 140 can be further controlled during flight of the aircraft 100. For example, drag forces can be reduced and a speed of the aircraft 100 increased during the cruise stage by adjusting the pitch angles of the blades 118, 126 134, 142 of one or more of the rotors 116, 124, 132, 140 to reduce drag. In some such examples, the rotor operation manager 156 selectively generates instructions for the motor controller(s) 122, 130, 138, 146 and the rotor pitch controller(s) 148, 150, 152, 154 to adjust the drag forces on particular rotor(s) 116, 124, 132, 140 while the rotor(s) 116, 124, 132, 140 are autorotating to affect the position and/or speed of the aircraft 100.

In some examples, the rotor operational manager 156 instructs the motors 120, 128, 136, 144 operate in a third motor operational state during flight of the aircraft 100. In such examples, the electric motors 120, 128, 136, 144 operate in a neutral state in which the motors 120, 128, 136, 144 free spin (i.e., torque is neither added nor subtracted during spinning of the motor; for example, there is no load on the motor shaft). In such examples, the batteries 155 do not provide power to the motors 120, 128, 136, 144, nor do the motors 120, 128, 136, 144 generate electricity that is provided to the batteries 155 to charge the batteries 155. Rather, when operating in the neutral state, the motor(s) 120, 128, 136, 144 act as bearing(s).

In examples in which the motors 120, 128, 136, 144 are operating in the third motor operational state or neutral state, the blades 118, 126, 134, 142 of the rotors 116, 124, 132, 140 autorotate. In some such examples, when the motors 120, 128, 136, 144 are operating in the third motor operational state or neutral state, the blades 118, 126, 134, 142 of the rotors 116, 124, 132, 140 can be feathered to, for instance, increase speed of the aircraft 100. In some examples, the rotor operational manager 156 instructs the motors 120, 128, 136, 144 to operate in the third motor operational state when the motors 120, 128, 136, 144 are, for example, transitioning between operating in the first operational state in which the motors 120, 128, 136, 144 drive rotation of the respective rotors 116, 124, 132, 140 and the second operational state in which the motors 120, 128, 136, 144 act as electrical generators. In some other examples, the rotor operational manager 156 instructs the motors 120, 128, 136, 144 to operate in the third motor operational state during cruise and may refrain from instructing the motors 120, 128, 136, 144 to operate in the second operational state.

Figure 2:
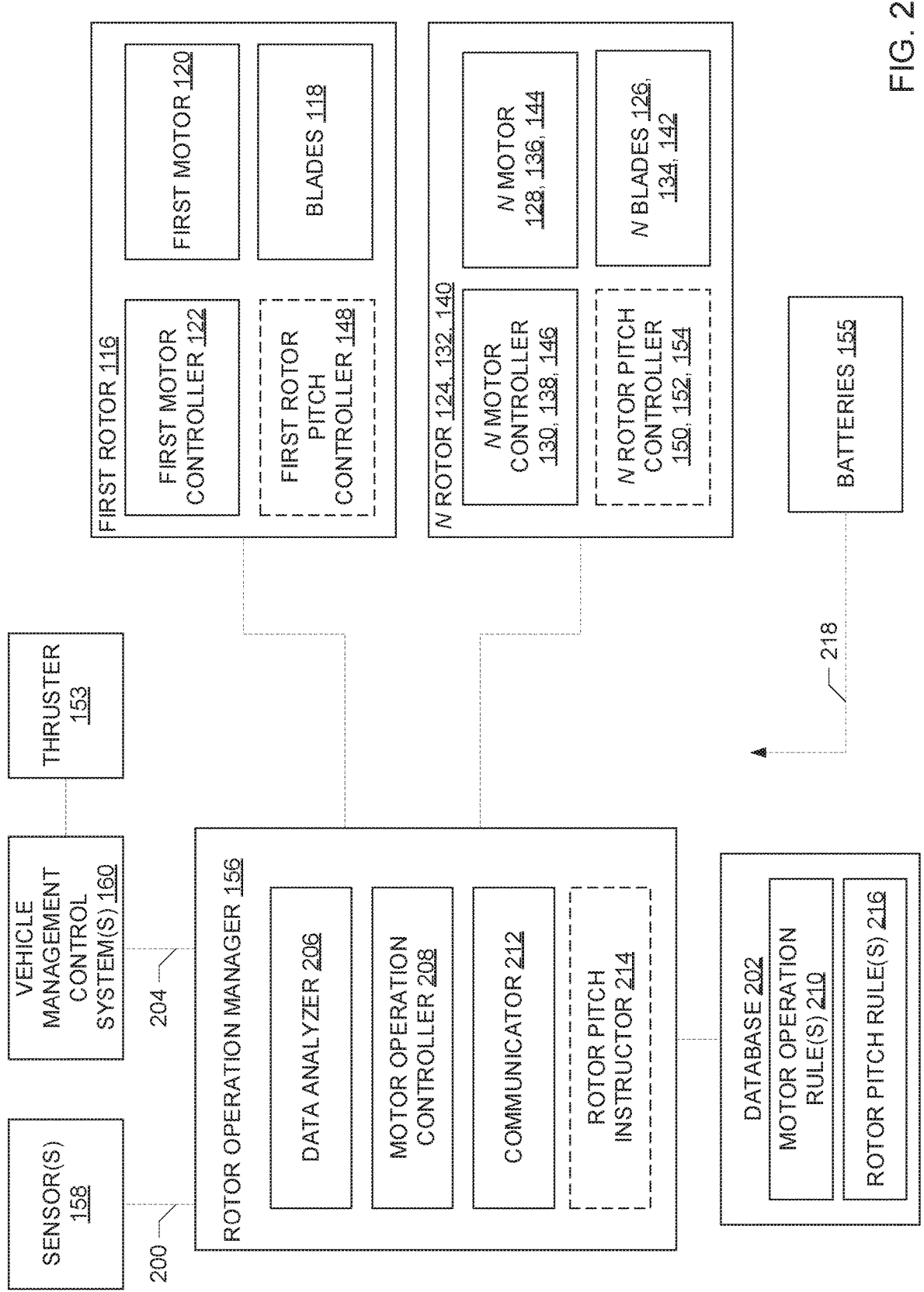
FIG. 2 is a block diagram of an example implementation of the rotor operation manager of FIG. 1, where motors associated with the rotors of the vehicle of FIG. 1 are in a first motor operational state.

FIG. 2 is a block diagram of an example implementation of the rotor operation manager 156 of FIG. 1. As mentioned above, the rotor operation manager 156 receives sensor data 200 from the sensor(s) 158 (e.g., the accelerometer(s), the gyroscope(s)) indicating, for example, position(s) of the aircraft 100 relative to the pitch, yaw, and/or roll axes. The sensor data 200 can be transmitted from the sensor(s) 158 to the rotor operation manager 156 substantially continuously or at predefined sampling intervals based on, for instance, sensor type and user setting(s) for the sensor(s) 158 and/or the rotor operation manager 156. The sensor data 200 is stored in a database 202. In some examples, the rotor operation manager 156 includes the database 202. In other examples, the database 202 is located external to the rotor operation manager 156 in a location accessible to the rotor operation manager 156 as shown in FIG. 2.

The example rotor operation manager 156 also accesses flight control data 204 from the vehicle management control system(s) 160. The flight control data 204 can include, for example, altitude data, speed data, heading, etc. In some examples, the flight control data 204 data includes user inputs requesting, for example, a change in aircraft speed, heading, and/or altitude. In some examples, the flight control data 204 includes data regarding operation of the thruster 153, such as an amount of thrust generated by the thruster 153. The flight control data 204 is stored in the database 202.

As illustrated in FIG. 2, the example rotor operation manager 156 is in communication with the first motor controller 122 of the first rotor 116. As discussed above, the first motor controller 122 is communicatively coupled to the first electric motor 120 of the first rotor 116. The first motor controller 122 generates instructions to control operation of the first rotor 116 based on instructions received from the rotor operation manager 156. For example, the first motor controller 122 can generate instructions to cause the blades 118 of the first rotor 116 to rotate during takeoff of the multirotor vehicle 100 of FIG. 1.

As mentioned above, in some examples, the first rotor 116 is a fixed pitched rotor. In other examples, the first rotor 116 is a variable pitch rotor. In examples in which the first rotor 116 is a variable pitch rotor, the example rotor operation manager 156 is in communication with the first rotor pitch controller 148.

As illustrated in FIG. 2, the example rotor operation manager 156 is in communication with the each of the motor controllers 130, 138, 146, associated with the respective rotors 124, 132, 140 of the example multirotor vehicle 100 of FIG. 1. Also, in examples in which the second, third, and fourth rotors 124, 132, 140 are variable pitch rotors, the rotor operation manager 156 is in communication with the second, third, and fourth rotor pitch controllers 150, 152, 154.

The example rotor operation manager 156 of FIG. 2 includes a data analyzer 206. The data analyzer 206 analyzes the sensor data 200 received from the sensor(s) 158 and/or the flight control data 204 received from the vehicle management control system(s) 160 to determine activity of the aircraft 100. For example, based on the analysis of altitude data, the data analyzer 206 determines a flight stage of the aircraft 100 such as takeoff or cruise. In some examples, the data analyzer 206 determines a position of the aircraft 100 relative to the pitch, roll, and/or yaw axes 157, 159, 161 based on the sensor data 200.

The example rotor operation manager 156 of FIG. 2 includes a motor operation controller 208. The motor operation controller 208 generates instructions that cause the motor(s) 120, 128, 136, 144 of the rotor(s) 116, 124, 132, 140 to operate in (a) the first motor operational state in which the motors convert electrical energy into mechanical energy to drive rotation of the blades 118, 126, 134, 142 of the rotor(s) 116, 124, 132, 140 or (b) the second motor operational state in which the motor(s) 120, 128, 136, 144 act as electrical generators and affect drag forces on the rotor(s) 116, 124, 132, 140 when the blades 118, 126, 134, 142 of the rotor(s) 116, 124, 132, 140 are autorotating. In the example of FIG. 2, the motor operation controller 208 selectively instructs to the motors 120, 128, 136, 144 to operate in the first or second motor operational states based on the analysis of the sensor data 200 and/or the flight control data 204 by the data analyzer 206 and one or more motor operation rules 210. The motor operation rules 210 define criteria for operating the motors 120, 128, 136, 144 in the first motor operational state or the second motor operational state. The motor operation rule(s) 210 can define which of the motor(s) 120, 128, 136, 144 should be instructed to control drag forces on particular rotors 116, 124, 132, 140 to affect pitch, yaw, or roll of the multirotor vehicle 100. The motor operation rule(s) 210, which can be based on user input(s), are stored in the database 202.

For example, if the data analyzer 206 determines that the aircraft 100 is in takeoff or initial ascent stage, the motor operation controller 208 generates instructions for the motors 120, 128, 136, 144 to operate in the first motor operational state to drive rotation of the blades 118, 126, 134, 142 of the rotors 116, 124, 132, 140 to enable the rotors generate lift. As disclosed herein, in some examples, if the data analyzer 206 determines that the aircraft 100 is in the cruise stage, the motor operation controller 208 generates instructions for the motors 120, 128, 136, 144 to operate in the second motor operational state to control drag forces on the rotors 116, 124, 132, 140 while the rotors 116, 124, 132, 140 are autorotating. For example, as further discussed herein, the motor operation controller 208 generates instructions for one or more of the motors 120, 128, 136, 144 operating in the second motor operational state to reduce rotational speed of the rotors 116, 124, 132, 140 to control pitch, yaw, or roll of the aircraft 100 based on the analysis of the sensor data 200 indicating movement of the aircraft 100 around the pitch, yaw, and/or roll axes by the data analyzer 206. As also disclosed herein, in some examples, if the data analyzer 206 determines that the aircraft 100 is in the cruise stage, the motor operation controller 208 can generate instructions for the motors 120, 128, 136, 144 to operate in the third motor operational state or neutral, free spinning state.

The example rotor operation manager 156 of FIG. 2 includes a communicator 212. The communicator 212 transmits the instructions to the motor controllers 122, 130, 138, 146 for controlling the motor(s) 120, 128, 136, 144 via one or more wired or wireless connections.

As mentioned above, in some examples, the rotor(s) 116, 124, 132, 140 are variable pitch rotors including blades 118, 126, 134, 142 that can be adjusted with respect to a pitch angle of the blades. In such examples, the rotor operation manager 156 includes a rotor pitch instructor 214, or means for controlling a pitch angle of the blades. The rotor pitch instructor 214 generates instructions for the pitch angle of the blades 118, 126, 134, 142 to be adjusted to, for example, reduce drag and increase speed during cruise. In the example of FIG. 2, the rotor pitch instructor 214 can generate instructions to adjust the pitch angle of the blades 118, 126, 134, 142 of the variable pitch rotors 116, 124, 132, 140 based on the analysis of the data 200, 204 by the data analyzer 206 and rotor pitch rule(s) 216. The rotor pitch rule(s) 216 define pitch angles for the blades 118, 126, 134, 142 to affect, for example, speed of the aircraft 100. The rotor pitch rule(s) 216, which can be based on user input(s), are stored in the database 202. In some examples, the rotor pitch instructor 214 generates instructions for the pitch of the blades 118, 126, 134, 142 to be adjusted when the motors 120, 128, 136, 144 are operating in the first motor operational state and the rotors 116, 124, 132, 140 are being electrically driven to rotate by the motors 120, 128, 136, 144.

In the example of FIG. 2, the motor operation controller 208 instructs the motor(s) 120, 128, 136, 144 to operate in the first motor operational state in which the motor(s) 120, 128, 136, 144 drive rotation of the blades 118, 126, 134, 142 of the rotor(s) 116, 124, 132, 140. As represented by the arrow 218, when the motors 120, 128, 136, 144 operate in the first motor operational state, power from the batteries 155 of the aircraft 100 is consumed during operation of the aircraft 100.

Figure 3:
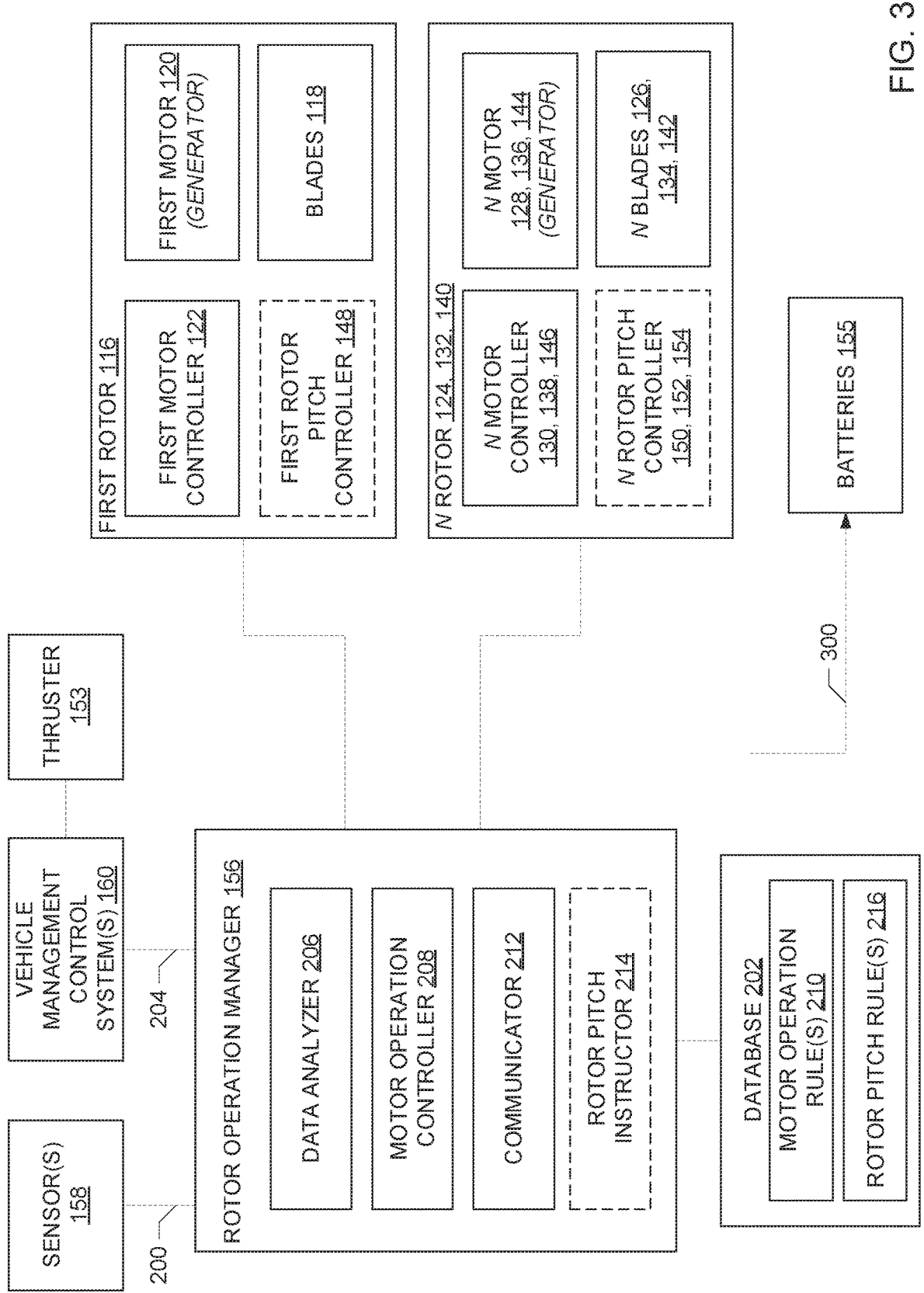
FIG. 3 is a block diagram of an example implementation of the rotor operation manager of FIG. 1, where the motors associated with the rotors of the vehicle of FIG. 1 are in a second motor operational state.

As discussed above, in some examples, the motor operation controller 208 instructs the motor(s) 120, 128, 136, 144 to operate in the second motor operational state in which the motor(s) 120, 128, 136, 144 act as electrical generators and control rotational speed of the rotor(s) 116, 124, 132, 140 as the rotor(s) are autorotating (e.g., during the cruise stage). FIG. 3 is a block diagram of an example implementation of the rotor operation manager 156 of FIGS. 1 and 2 in which the motor operation controller 208 instructs the motor controller(s) 122, 130, 138, 146 to operate the motor(s) 120, 128, 136, 144 in the second motor operational state.

In the example of FIGS. 2 and 3, when the data analyzer 206 determines that the aircraft 100 is entering the cruise stage, the motor operation controller 208 instructs the motors 120, 128, 136, 144 to turn off or temporarily refrain from driving the rotors to enable the blades 118, 126 134, 142 of the rotor(s) 116, 124, 132, 140 autorotate as a result of air moving through the blades 118, 126 134, 142. During cruise, the wings 108, 110, 112, 114 (FIG. 1) of the aircraft 100 and the autorotating rotors 116, 124, 132, 140 generate lift for the aircraft 100. Also, the thruster 153 generates horizontal thrust forces to move the aircraft 100 forward.

In some examples, a speed of rotation of the blades 118, 126 134, 142 (e.g., RPM) is increased as a result of movement of the air through the blades 118, 126 134, 142 as compared to if the rotation of the blades 118, 126 134, 142 where driven by the motors 120, 128, 136, 144. Thus, in some examples, autorotation of the rotor(s) 116, 124, 132, 140 during the cruise stage of the aircraft 100 can increase the speed of the aircraft 100.

In the example if FIG. 3, the motor operation controller 208 of the rotor operation manager 156 instructs the electric motors 120, 128, 136, 144 to operate in the second motor operational state to control the rotational speed of the autorotating rotors 116, 124, 132, 140 and, as a result, affect the pitch, yaw, and roll of the aircraft 100. In particular, the motor operation controller 208 generates instructions that cause the motors 120, 128, 136, 144 to selectively increase the drag forces on the rotor(s) 116, 124, 132, 140, which affects (i.e., decrease) the rotational speed of the autorotating rotors 116, 124, 132, 140. Based on the selective adjustments of the drag forces on each rotor 116, 124, 132, 140 via the respective motor(s) 120, 128, 136, 144, the rotor operation manager 156 controls yaw, pitch, and roll of the aircraft 100.

For example, to reduce rotational speed of the rotor(s) 116, 124, 132, 140, to motor operation controller 208 generates instructions for one or more of the motors 120, 128, 136, 144 to generate a braking torque (e.g., a negative torque). The generation of the braking torque increases drag or resistance experienced by the autorotating rotor(s) 116, 124, 132, 140 (e.g., on the shafts of the rotor(s) 116, 124, 132, 140). As a result, the rotational speed (e.g., RPM) of the rotor(s) 116, 124, 132, 140 decreases.

As disclosed above, the data analyzer 206 of the rotor operation manager 156 analyzes data 200, 204 from the sensor(s) 158 and/or the vehicle management control system(s) 160 measuring, for example, speed, rotational movement, thrust generated by the thruster 153, etc. of the aircraft 100 during flight. Based on the analysis of the data 200, 204 by the data analyzer 206, the example motor operation controller 208 selectively instructs the motor(s) **120, 128, 136, 144 to adjust the rotational speed of one or more of the rotor(s) 116, 124, 132, 140 to control, for instance, pitch and yaw of the aircraft 100 during cruise. In the example of FIG. 3, the motor operation controller 208 selectively instructs the motor(s) 120, 128, 136, 144 to increase drag forces on the corresponding rotor(s) 116, 124, 132, 140 to balance the rotor drag forces against the thrust vector associated with the thruster 153 to control the movement of the aircraft 100 with respect to the yaw, pitch, or roll axes.

For example, the motor operation controller 208 can selectively instruct the second motor 128 and the fourth motor 144 to increase drag forces to reduce rotational speed of the respective second rotor 124 and the fourth rotor 140 relative to the drag forces on the first rotor 116 and the third rotor 132. As a result, movement of the multirotor aircraft 100 relative to the roll axis can be adjusted. As another example, to adjust the pitch of the aircraft 100, the motor operation controller 208 can generate instructions for the rotational speeds of the first rotor 116 and the second rotor 124 to vary relative to the rotational speeds of the third rotor 132 and the fourth rotor 140. In such examples, the motor operation controller 208 can transmit instructions to, for instance, the first and second motor controllers 122, 130 to increase drag forces to reduce the rotational speed of the first and second rotors 116, 124. In other examples, the motor operation controller 208 transmits instructions to, for instance, the third and fourth motor controllers 138, 146 to increase drag and reduce the rotational speed of the third and fourth rotors 132, 140 based on the direction in which the aircraft 100 is to move relative to the pitch axis. Thus, the example motor operation controller 208 of FIGS. 2 and 3 selectively adjusts the drag applied to the autorotating rotors 116, 124, 132, 140 to control speed of the rotors 116, 124, 132, 140. Put another way, the motor operation controller 208 of the rotor operation manager 156 uses drag vectoring to adjust the drag forces on one or more of the rotors 116, 124, 132, 140 (e.g., relative to the thrust vector associated with the thruster 153) to control yaw, pitch, and roll of the aircraft 100.

In the example of FIG. 3, the motor(s) 120, 128, 136, 144 convert mechanical energy generated by the autorotation of the rotor(s) 116, 124, 132, 140 into electrical energy to reduce the rotational speed of the rotor(s) 116, 124, 132, 140. Thus, in the second motor operational state, the motor(s) 120, 128, 136, 144 are electrical generators. Further, the autorotating rotor(s) 116, 124, 132, 140 can be considered to be acting as wind turbines, as they provide for the conversion of energy from the moving air into electrical energy. As represented by arrow 300 in FIG. 3, the electricity generated by the motor(s) 120, 128, 136, 144 when operating in the second motor operational state is provided to the batteries 155 to charge the batteries 155. Thus, the example multirotor aircraft 100 of FIG. 1 employs regenerative braking principles to efficiently operate the aircraft 100 by charging the batteries 155 of the aircraft 100 during flight.

In examples in which the rotors 116, 124, 132, 140 are variable pitch rotors such that a pitch of the blades 118, 126, 134, 142 of respective rotors can be adjusted, the rotor pitch instructor 214 of the example rotor operation manager 156 generates instructions to selectively control the pitch angle of the blades 118, 126, 134, 142 when the motors 120, 128, 136, 144 are operating in the second motor operational state and the rotors 116, 124, 132, 140 are autorotating. In some examples, the rotor pitch instructor 214 generates the instructions to adjust the pitch angle of the blades 118, 126, 134, 142 based on the determination of the flight stage of the aircraft 100. For example, if the data analyzer 206 determines that the aircraft 100 is in the cruise stage, the rotor pitch instructor 214 can generates instructions that are transmitted to the first, second, third, and fourth rotor pitch controllers 148, 150, 152, 154 to feather the blades 118, 126, 134, 142. During autorotation of the rotors 116, 124, 132, 140, feathering of the blades 118, 126, 134, 142 can reduce the drag experienced by the rotors 116, 124, 132, 140 and increase speed of the aircraft 100. The rotor pitch instructor 214 can selectively adjust the pitch angle of the blades 118, 126, 134, 142 of the rotors 116, 124, 132, 140 to further control the rotational speed of the rotors 116, 124, 132, 140 in addition to the effects of drag vectoring by the motor operating controller 208.

Thus, the example rotor operation manager 156 selectively controls the aircraft 100 with respect to pitch, yaw, and roll while the motors 120, 128, 136, 144 are operating in the second motor operational state as electrical generators and the 116, 124, 132, 140 are autorotating. By selectively controlling the drag forces on the rotors 116, 124, 132, 140 and, in some examples, the pitch angle of the blades 118, 126, 134, 142 of the rotors 116, 124, 132, 140, the example rotor operation manager 156 controls rotational movement of the multirotor vehicle 100. Further, by using regenerative braking to control the rotational speed of the rotors 116, 124, 132, 140, the electric motors 120, 128, 136, 144 generate electricity energy that is used to charge the batteries 155 of the aircraft 100 during flight. Thus, because the motors 120, 128, 136, 144 serve as means for generating power during flight, a separate (e.g., gas powered) generator to charge the batteries 155 is not needed. Further, the size of the batteries 155 can be reduced as compared to if the aircraft 100 carried batteries 155 that were not able be charged during flight. Thus, weight of the motors 120, 128, 136, 144 and/or the fuel-burning thruster 153 is offset by the use of batteries with less weight and/or by elimination of a separate generator for the batteries.

As disclosed herein, in some examples, the rotor operation manager 156 generates instructions for the electric motors 120, 128, 136, 144 to operate in the third motor operational mode or a neutral state in which the electric motors 120, 128, 136, 144 free spin. In some examples, the motor operation controller 208 generates instructions that are transmitted to the motor controllers 122, 130, 138, 146 to cause the electric motors 120, 128, 136, 144 to operate in the neutral state. For example, the motor operation controller 208 can generate instructions for the motors 120, 128, 136, 144 to operate the third operational state when the data analyzer 206 determines that the aircraft 100 is entering the cruise stage. In some examples, the motor operation controller 208 instructs the motors 120, 128, 136, 144 to operate in the third motor operational state for at least some period of time during the cruise stage to increase a cruise speed of the aircraft 100 and/or before the motors 120, 128, 136, 144 switch to operating in the second motor operational state as electrical generators. In some examples, the motor operation controller 208 instructs the motors 120, 128, 136, 144 to operate in the third motor operational state based on the data 200, 204 received from the sensor(s) 158 and/or the vehicle management control system(s) 160 indicating, for instance, aircraft speed, position of the aircraft 100 along a flight path, environmental conditions, etc.

In examples in which the motors 120, 128, 136, 144 are operating in the third motor operational state, the blades 118, 126, 134, 142 of the rotors 116, 124, 132, 140 autorotate. In some examples, the rotor pitch instructor 214 generates instructions that are transmitted to the respective rotor pitch controllers 148, 150, 152, 154 to cause the blades 118, 126, 134, 142 to feather while the motors 120, 128, 136, 144 are operating in the third motor operational state. Feathering of the blades 118, 126, 134, 142 during autorotation of the rotors 116, 124, 132, 140 can reduce the drag experienced by the rotors 116, 124, 132, 140 and increase speed of the aircraft 100 during flight.

In some examples, the motor operation controller 208 generates instructions for, for instance, the motors 120, 128, 136, 144 to switch from operating in the third operational mode to operating the second operational mode in which the motors 120, 128, 136, 144 increase drag and reduce the rotational speed of the rotor(s) 116, 124, 132, 140 to control yaw, pitch, and roll of the aircraft 100. In some examples, the motor operation controller 208 generates instructions for the motors 120, 128, 136, 144 to switch from operating in the second operational mode to operating in the third operational mode or neutral state mode to increase a cruise speed of the aircraft 100. In some examples, the motor operation controller 208 generates instructions for the motors 120, 128, 136, 144 to switch from operating in the first mode operational mode in which the motors 120, 128, 136, 144 drive rotation of the rotors 116, 124, 132, 140 (e.g., during takeoff) to operating in the third motor operational mode based on, for instance, the data 200, 204 received from the sensor(s) 158 and/or the vehicle management control system(s) 160. Thus, the rotor operation manager 156 selectively determines the operational mode of the motors 120, 128, 136, 144 to optimize aircraft speed and/or position in view of the flight stages of the aircraft 100.

While an example manner of implementing the rotor operation manager 156 of FIG. 1 is illustrated in FIGS. 2 and 3, one or more of the elements, processes and/or devices illustrated in FIGS. 2 and 3 may be combined, divided, re-arranged, omitted, eliminated and/or implemented in any other way. Further, the example database 202, the example data analyzer 206, the example motor operation controller 208, the example communicator 212, the example rotor pitch instructor 214 and/or, more generally, the example rotor operation manager 156 of FIGS. 2 and 3 may be implemented by hardware, software, firmware and/or any combination of hardware, software and/or firmware. Thus, for example, any of the example database 202, the example data analyzer 206, the example motor operation controller 208, the example communicator 212, the example rotor pitch instructor 214 and/or, more generally, the example rotor operation manager 156 of FIGS. 2 and 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example database 202, the example data analyzer 206, the example motor operation controller 208, the example communicator 212, and/or the example rotor pitch instructor 214 is/are hereby expressly defined to include a non-transitory computer readable storage device or storage disk such as a memory, a digital versatile disk (DVD), a compact disk (CD), a Blu-ray disk, etc. including the software and/or firmware. Further still, the example rotor operation manager 156 may include one or more elements, processes and/or devices in addition to, or instead of, those illustrated in FIGS. 2 and 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
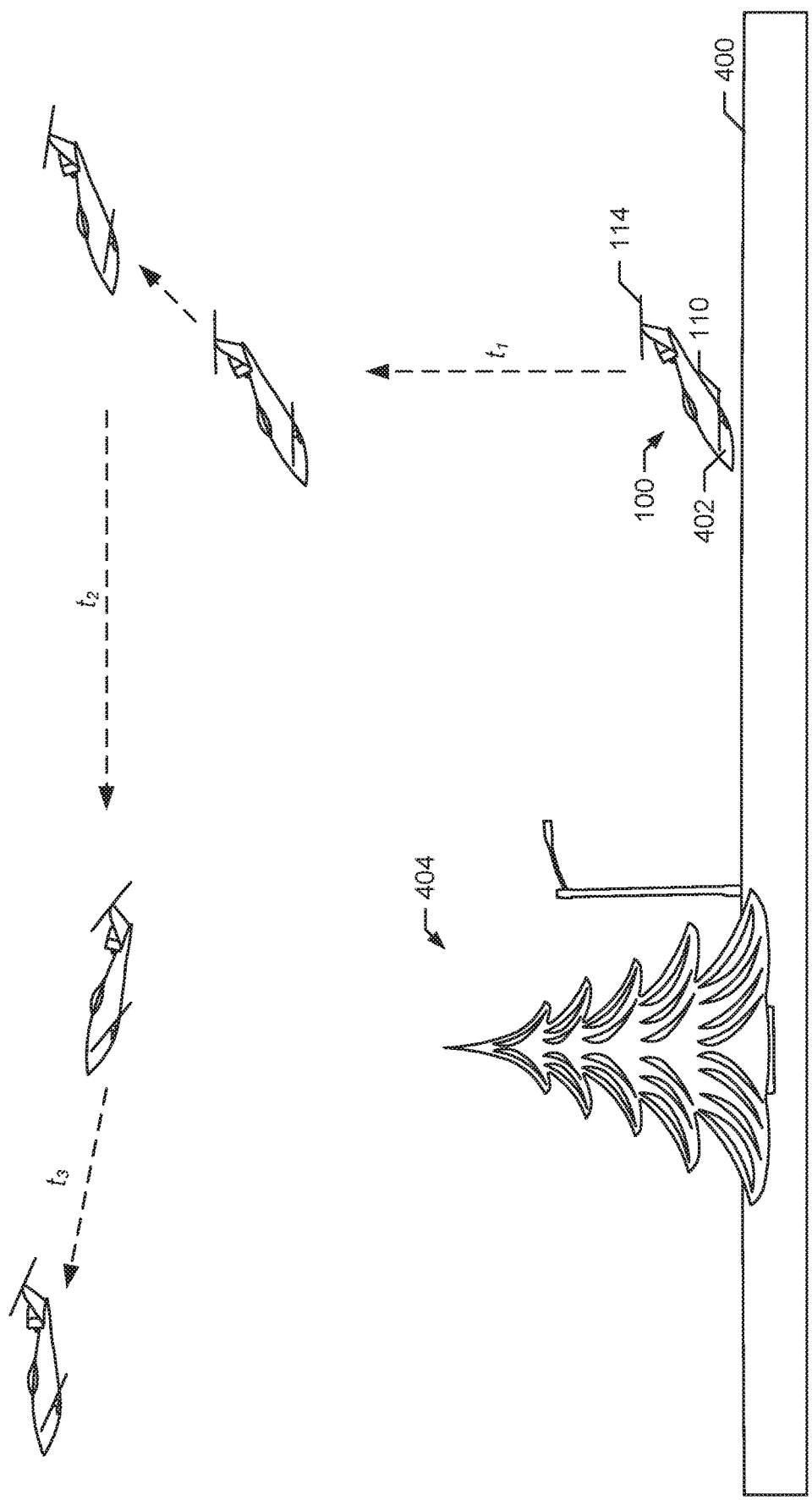
FIG. 4 is a schematic illustration of a flight profile of the example multirotor vehicle of FIG. 1.

FIG. 4 is a diagram of an example flight profile of the example multirotor vehicle or aircraft 100 of FIGS. 1-3. In the example of FIG. 4, at time $t_1$, the blades 118, 126, 134, 142 of the rotors 116, 124, 132, 140 of the multirotor aircraft 100 of FIG. 1 begin to rotate for vertical takeoff. In the example of FIG. 4, rotation of the blades 118, 126, 134, 142 is driven by the electric motors 120, 128, 136, 144 operating in the first motor operational state based on instructions from the motor operation controller 208 of the rotor operation manager 156 of FIGS. 1-3. Thus, lift for vertical takeoff of the aircraft 100 can be generated without reliance on the fuel-burning thruster 153.

As shown in FIG. 4, in some examples, the wings 108, 110, 112, 114 are oriented relative to the frame 102 of the aircraft 100 such that a plane of rotation of the rotors 116, 124, 132, 140 during takeoff is horizontal relative to a ground surface 400 (where the second and fourth wings 110, 114 are shown in FIG. 4). The horizontal plane of rotation of the rotors 116, 124, 132, 140 provides for vertical takeoff of the aircraft 100. Also, during vertical takeoff, a nose 402 of the aircraft 100 is directed toward the ground surface 400, which provides a pilot of the aircraft 100 with increased visibility of the surrounding environment as compared to if the nose 402 of the aircraft 100 were substantially horizontal. For example, an environment in which the aircraft 100 takes off can include, for example, a tree canopy 404 and the downward tilt of the nose 402 of the aircraft 100 improves a visibility of the pilot through the tree canopy 404.

After takeoff, at time $t_2$ (occurring sometime after time $t_1$), the thruster 153 of the aircraft 100 is activated to provide for forward horizontal acceleration of the aircraft 100. As the aircraft 100 gains forward velocity, the electric motors 120, 128, 136, 144 throttle back to reduce drag and enable horizontal acceleration of the aircraft 100. Thus, during takeoff and initial ascent, the electric motors 120, 128, 136, 144 operate in the first motor operational state to drive rotation of the rotors 116, 124, 132, 140.

At time $t_3$ (occurring sometime after time $t_1$ and $t_2$), the aircraft 100 begins to enter the cruise stage. The data analyzer 206 of the rotor operation manager 156 detects that the aircraft 100 has reached a cruising altitude or is within a range thereof based on sensor data 200. The motor operation controller 208 of the rotor operation manager 156 generates instructions for the motors 120, 128, 136, 144 to turn off to enable the rotors 116, 124, 132, 140 to autorotate during cruise. In some examples, the motor operation controller 208 generates instructions for the motors 120, 128, 136, 144 to operate in a neutral or free spinning state (e.g., the third motor operational state) during the cruise stage. In some examples, the rotor pitch instructor 214 generates instructions for the blades 118, 126, 134, 142 of the rotors 116, 124, 132, 140 to feather when the motors 120, 128, 136, 144 to, for instance, increase a cruise speed of the aircraft 100.

During the cruise stage, the motor operation controller 208 generates instructions to control yaw, pitch, and roll of the aircraft 100 by selectively adjusting the drag forces on the rotor(s) 116, 124, 132, 140 via the motor(s) 120, 128, 136, 144. As disclosed herein, the motor operation controller 208 generates instructions for the respective motors 120, 128, 136, 144 to operate in the second motor operational state to adjust rotational speed of one or more of the autorotating rotor(s) 116, 124, 132, 140 via electrical braking. The motor operation controller 208 balances drag forces on the rotors 116, 124, 132, 140 against the thrust generated by the thruster 153 to adjust the rotation of the aircraft 100 relative to the pitch, yaw, or roll axes.

As disclosed above, electrical energy generated by the electric motors 120, 128, 136, 144 during regenerative braking is used to charge the batteries 155 of the aircraft 100. The electric motors 120, 128, 136, 144 of aircraft 100 can be powered by the charged batteries 155 during, for example, vertical landing of the aircraft 100 (e.g., occurring at some time after time $t_3$). As another example, in the event of, for example, failure of the thruster 153, the electric motors 120, 128, 136, 144 of aircraft 100 can be powered by the charged batteries 155 and used to fly and land the aircraft 100. Thus, the charging of the batteries 155 using electrical energy generated by the motors 120, 128, 136, 144 during flight provides the aircraft 100 with a back-up power source in the event of failure of the fuel-burning thruster 153. Further, a separate generator to charge the batteries 155 is no longer needed to be carried by the aircraft 100.

Figure 5:
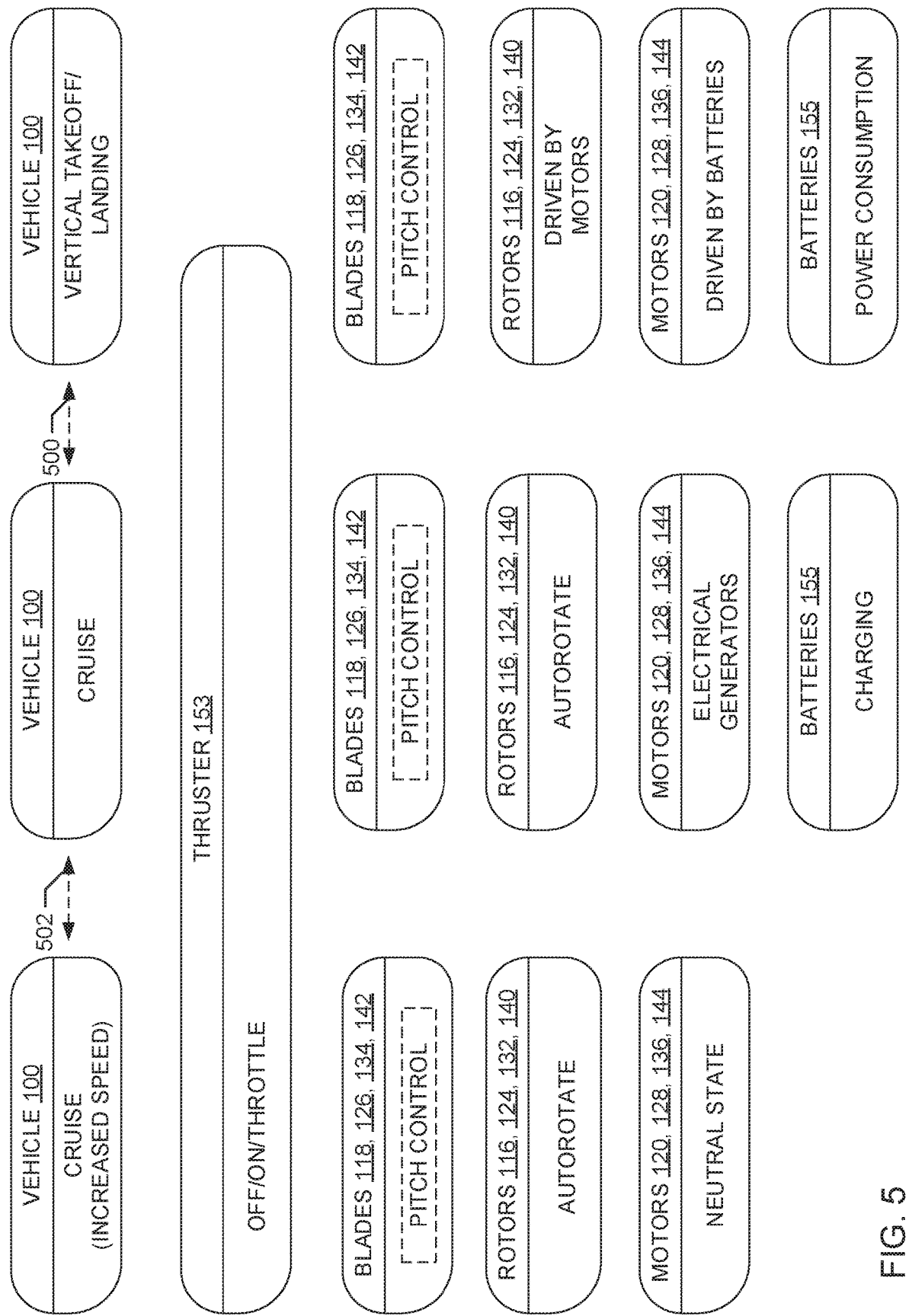
FIG. 5 is an example state diagram for operation of the example multirotor vehicle of FIG. 1.

FIG. 5 is a state diagram showing example operational states of the rotors 116, 124, 132, 140 and the motors 120, 128, 136, 144 during different flight stages of the example aircraft or vehicle 100 of FIGS. 1 and 4. As disclosed herein, in some examples, the example aircraft 100 takeoffs via vertical takeoff in which the motors 120, 128, 136, 144 of the aircraft 100 are powered by the batteries 155 of the aircraft 100 (e.g., the motors 120, 128, 136, 144 are operating in the first motor operational state) and the rotation of the respective rotors 116, 124, 132, 140 is driven by the corresponding motors 120, 128, 136, 144 to generate lift for the aircraft 100. In some examples, the aircraft 100 employs vertical takeoff when taking off from, for instance, a helipad. In some examples, a pitch of the blades 118, 126, 134, 142 of the rotor(s) 116, 124, 132, 140 can be adjusted when rotation of the rotors 116, 124, 132, 140 is driven by the motors 120, 128, 136, 144 (e.g., via the rotor pitch instructor 214 of FIGS. 2 and 3).

As also shown in FIG. 5, during flight, the aircraft 100 enters the cruise stage. In some examples, for at least some time during the cruise stage, the motors 120, 128, 136, 144 operate in a neutral state or a free-spinning state (e.g., the third motor operational state) based on instructions from the motor operation controller 208 of FIGS. 2 and 3. In such examples, the rotors 116, 124, 132, 140 autorotate. In some such examples, the blades 118, 126, 134, 142 of the rotors 116, 124, 132, 140 are feathered (e.g., based on instructions from the rotor pitch instructor 214) to increase a speed of the aircraft 100 during cruise.

As shown in FIG. 5, in some examples, for at least some time during the cruise stage, the motors 120, 128, 136, 144 operate as electrical generators (e.g., in the second motor operational state). In such examples, the motors 120, 128, 136, 144 control pitch, yaw, and roll of the aircraft 100 by controlling drag forces on the rotor(s) 116, 124, 132, 140 in view of the thrust vector generated by the thruster 153 of the aircraft 100. As shown in FIG. 5, when the motors 120, 128, 136, 144 are acting as electrical generators, the batteries 155 are charged via the generators. In some examples, pitch of the blades 118, 126, 134, 142 is adjusted (e.g., by the rotor pitch instructor 214) to affect speed of the aircraft 100.

As illustrated by arrows 500, 502 in FIG. 5, the aircraft 100 and, thus, the rotors 116, 124, 132, 140 and the motors 120, 128, 136, 144 of the aircraft 100 can selectively move between operational states during operation of the aircraft 100. For example, the motors 120, 128, 136, 144 may switch from operating in either the neutral state or the second motor operational state to operating in the first motor operational state during vertical landing of the aircraft 100. In other examples, the motors may operate in the second operational mode as electrical generators after the aircraft 100 takes off from an airport running using thrust generated by the thruster 153 and enters the cruise stage. In such examples, the motors may operate in the first operational mode if, for instance, the aircraft 100 employs vertical landing to land.

Figure 6A:
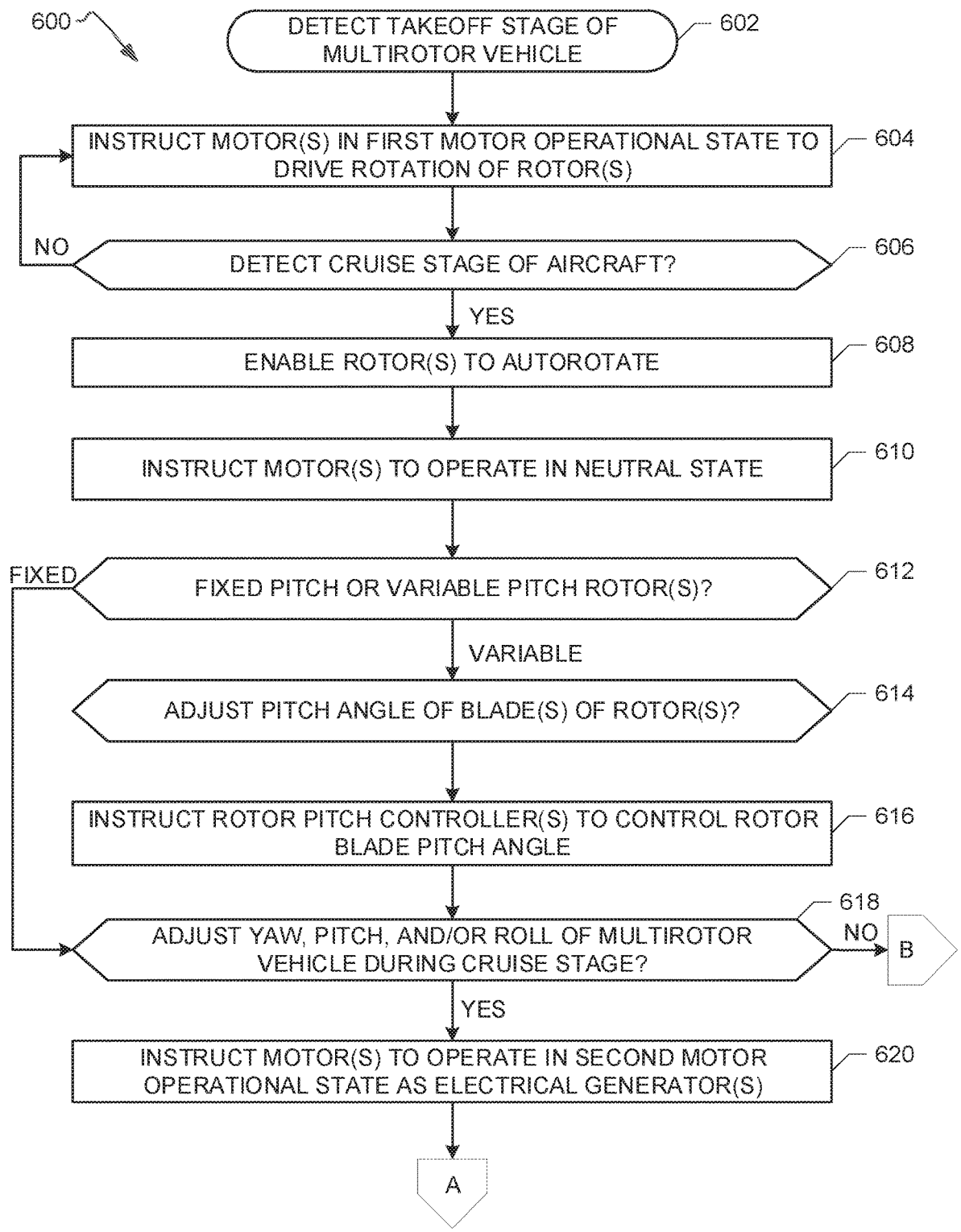
FIGS. 6A and 6B include a flowchart representative of machine readable instructions which may be executed to implement the example rotor operation manager of FIG. 2.
Figure 6B:
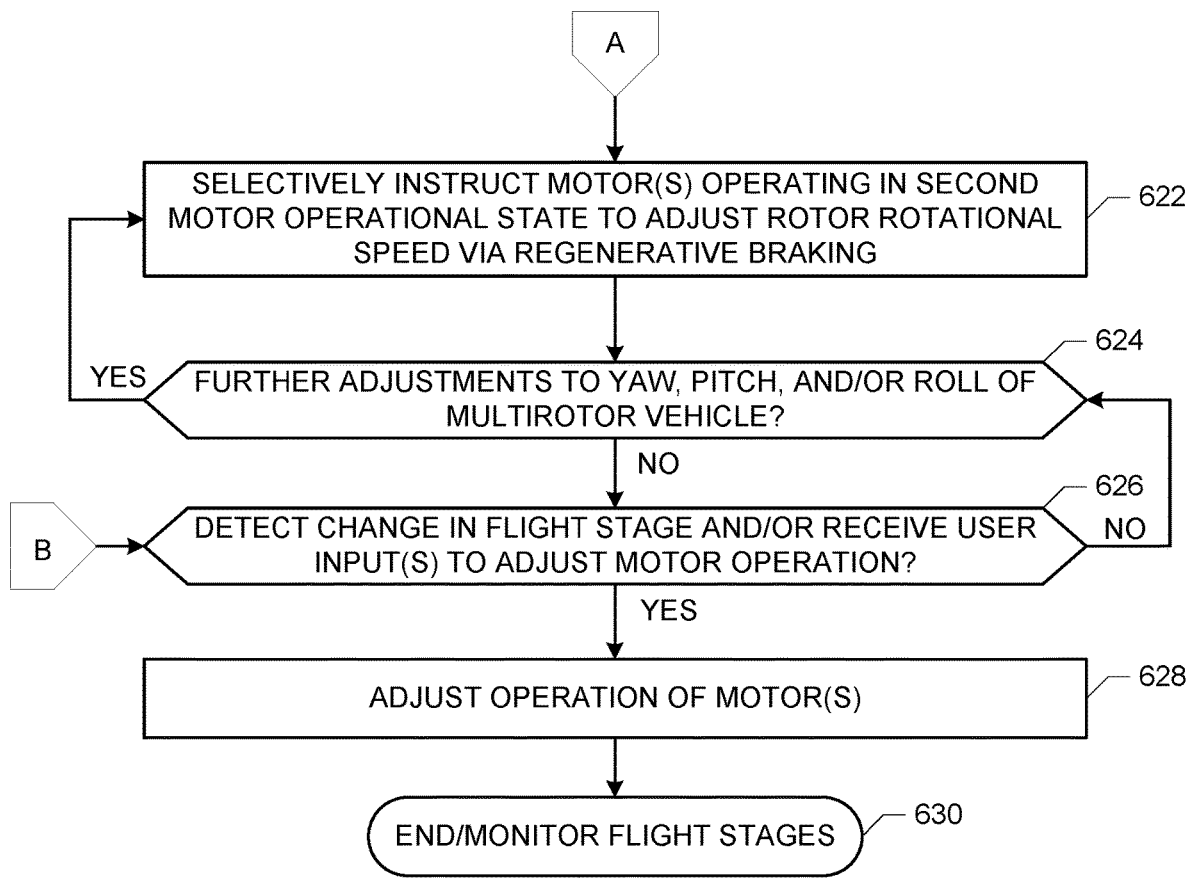

A flowchart representative of example hardware logic, machine readable instructions, hardware implemented state machines, and/or any combination thereof for implementing the example rotor operation manager 156 of FIGS. 1-3 is shown in FIGS. 6A and 6B. The machine readable instructions may be one or more executable programs or portion(s) of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIGS. 6A and 6B, many other methods of implementing the example rotor operation manager 156 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a field programmable gate array (FPGA), an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example process of FIGS. 6A and 6B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIGS. 6A and 6B include a flowchart of an example method 600 to selectively control operation of one or more rotors of a multirotor vehicle (e.g., the multirotor vehicle 100 of FIG. 1 including the rotors 116, 124, 132, 140) via motors associated with the rotors operating in a first motor operational state or a second motor operational state. The example method 600 of FIGS. 6A and 6B can implemented by the example rotor operation manager 156 of FIGS. 1-3.

The example method 600 begins with detecting that the multirotor vehicle is in a takeoff flight stage (block 602). For example, the data analyzer 206 of the rotor operation manager 156 can detect that the multirotor vehicle 100 of FIG. 1 is in the takeoff flight stage based on sensor data 200 generated by the sensor(s) 158 and/or flight control data 204 received from the vehicle management control system(s) 160.

The example method 600 of FIGS. 6A and 6B includes instructing motors associated with the rotors of the multirotor vehicle 100 to operate in a first motor operational state to drive rotation of blades of the rotors (block 604). For example, the motor operation controller 208 of the rotor operation manager 156 instructs the motors 120, 128, 136, 144 associated with the respective rotors 116, 124, 132, 140 of the multirotor vehicle 100 to drive the rotation of the blades 118, 126, 134, 142 of the rotors 116, 124, 132, 140 based on the motor operation rule(s) 210. The motor operation controller 208 instructs the motors 120, 128, 136, 144 via the communicator 212 of the rotor operation manager 156 and the motor controllers 122, 130, 138, 146 in communication with the respective motors 120, 128, 136, 144. When the motors 120, 128, 136, 144 are operating in the first motor operational state in which the motors 120, 128, 136, 144 drive rotation of the rotors 116, 124, 132, 140, the rotors 116, 124, 132, 140 generate lift for the vehicle 100 during, for example, vertical takeoff. When the rotors 116, 124, 132, 140 are driven to rotate by the motors 120, 128, 136, 144, the rotors are operating in the first rotor operational state.

The example method 600 includes determining if the multirotor vehicle is in the cruise state of flight (block 606). For example, the data analyzer 206 of the rotor operation manager 156 can determine that the multirotor vehicle 100 is in the cruise stage of flight based on altitude data transmitted by the vehicle management control system(s) 160.

If the multirotor vehicle is in the cruise stage of flight, the example method 600 includes enabling the rotors to autorotate, or to rotate as a result of the passage of air through the blades of the rotors (block 608). For example, the motor operation controller 208 can instruct the motors 120, 128, 136, 144 to turn off or temporarily refrain from driving rotation of the rotors 116, 124, 132, 140 based on the motor operation rule(s) 210.

In FIGS. 6A and 6B, when the rotors are autorotating, the example method 600 includes instructing the motors to operate in a neutral or free-spinning state (block 610). For example, the motor operation controller 208 instructs the motors 120, 128, 136, 144 to operate in the neutral state in which the motors 120, 128, 136, 144 are free spinning and neither adding or subtracting torque.

In FIGS. 6A and 6B, if the rotors of the multirotor vehicle are variable pitch rotors, the example method 600 includes determining if a pitch angle of the blades of the rotors should be adjusted and, if so, instructing rotor pitch controller associated with the rotors to adjust the pitch angle (blocks 612, 614, 616). In the example of FIGS. 6A and 6B, the pitch angle of the blades may be adjusted to, for instance, reduce drag on the rotors and increase a speed of the aircraft during flight. For example, the rotor pitch instructor 214 of the rotor operation manager 156 instructs one or more of the rotor pitch controllers 148, 150, 152, 154 in communication with the motors 120, 128, 136, 144 to adjust the pitch angle of the blades 118, 126, 134, 142 based on the rotor pitch rule(s) 216.

The example method 600 of FIGS. 6A and 6B includes determining if the yaw, pitch, and/or roll of the multirotor vehicle should be adjusted during the cruise stage (block 618). For example, the data analyzer 206 of the rotor operation manager 156 can determine that the position of the multirotor vehicle 100 should be adjusted relative to the pitch axis 157, the roll axis 159, and/or the yaw axis 161 based on the sensor data 200 from the sensor(s) 158 (e.g., accelerometers, gyroscopes) and/or the flight control status data 204 from the vehicle management control system(s) 160 indicating, for example, a change in heading of the vehicle 100.

If the yaw, pitch, and/or roll of the multirotor vehicle is to be adjusted, the example method 600 instructing the motors to operate in a second motor operational state as electrical generators (block 620). For example, the motor operation controller 208 instructs the motors 120, 128, 136, 144 to operate in the second motor operation state such that the motors 120, 128, 136, 144 control the rotational speed of the rotors 116, 124, 132, 140 via generation of a negative torque, which results in the generation of electrical energy the motors 120, 128, 136, 144. The motor operation controller 208 causes the motors 120, 128, 136, 144 to switch from operating in the neutral state to the second motor operational state based on the motor operation rule(s) 210.

If the yaw, pitch, and/or roll of the multirotor vehicle is to be adjusted, the example method 600 includes selectively instructing one or more of the motors operating in the second motor operational state to adjust rotational speed of the rotors via regenerative braking (block 622). For example, the motor operation controller 208 selectively instructs the first, second, third, and/or fourth motors 120, 128, 136, 144 to generate a braking torque that increases drag forces on the corresponding rotor(s) 116, 124, 132, 140 and reduces the rotational speed of the rotor(s) 116, 124, 132, 140. The motor operation controller 208 can selectively instruct the motor(s) 120, 128, 136, 144 to control drag forces on the rotor(s) 116, 124, 132, 140 based on the motor operation rule(s) 210, which define which rotors should be affected to adjust movement of the vehicle 100 about the pitch, yaw, and/or roll axes, and the thrust vector generated by the fuel-burning thruster 153. In some examples, the motor operation controller 208 balances the drag forces on the rotor(s) 116, 124, 132, 140 against the thrust vector generated by the fuel-burning thruster 153 to control the position of the vehicle relative to one or more rotational axes As disclosed herein, the electrical energy generated by the motor(s) 120, 128, 136, 144 can be used to charge the batteries 155 of the multirotor vehicle 100.

The example method 600 continues with determining if further adjustments should be made to the pitch, yaw, and/or roll of the multirotor vehicle and continuing to implement those changes via control of the drag forces on the autorotating rotors (block 624). If no further adjustments are to be performed, the example method 600 of FIGS. 6A and 6B includes determining if the multirotor vehicle has undergone a change in flight stage (block 626). For example, the data analyzer 206 can determine that the multirotor vehicle 100 is landing based on the data 200, 204 from the sensor(s) 158 and/or the vehicle management control system(s) 160.

The example method 600 of FIGS. 6A and 6B includes adjusting an operation of the motor(s) based on the flight stage and/or user inputs (block 628). For example, the motor operation controller 208 can instruct the motor(s) 120, 128, 136, 144 to return to operating in the first motor operational state to control the rotation of the rotors 116, 124, 132, 140 based on user input(s) received via the vehicle management control system(s) 160 (block 604). In some examples, the motor operation controller 208 can instruct the motor(s) 120, 128, 136, 144 to operate in the third motor operational mode, or neutral motor state (e.g., block 610). The example method 600 ends with monitoring the flight activity of the multirotor vehicle (block 630).

Figure 7:
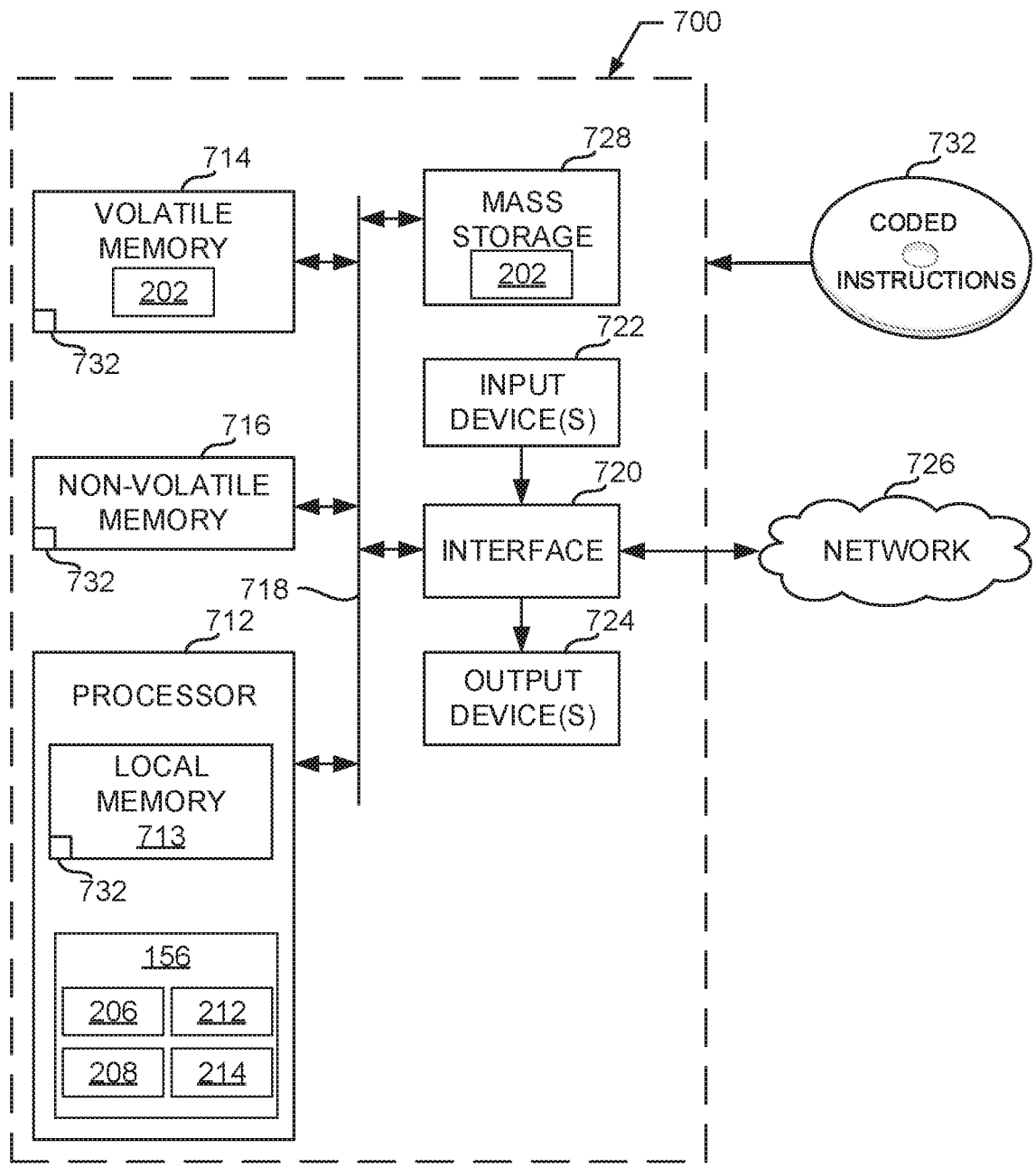
FIG. 7 is a block diagram of an example processing platform structured to execute the instructions of FIGS. 6A and 6B to implement the rotor operation manager of FIG. 2.

FIG. 7 is a block diagram of an example processor platform 700 capable of executing instructions to implement the method of FIGS. 6A and 6B and/or to implement the rotor operation manager 156 of FIGS. 1-3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data analyzer 206, the example motor operation controller 208, the example communicator 212, and the example rotor pitch instructor 214.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a peripheral component interconnect (PCI) express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

Coded instructions 732 of FIG. 7 may be stored in the mass storage device 728, in the volatile memory 714, in the non-volatile memory 716, and/or on a removable non-transitory computer readable storage medium such as a CD or DVD.

From the foregoing, it will be appreciated that example hybrid multirotor vehicles have been disclosed herein that selectively control operation of rotors during different flight stages of the vehicles. Example multirotor vehicles disclosed herein include a rotor operation manager to instruct electric motors associated with the rotors to operate in a first operational mode in which the motors drive rotation of the rotors and a second operational mode in which the motors control rotational speed of the rotors while the rotors are autorotating via regenerative breaking. By selectively controlling drag forces on the autorotating rotors to affect the rotational speed of the rotors, the example rotor operation manager adjusts the pitch, yaw, and/or roll of the vehicle during, for instance, a cruise stage of flight. In examples disclosed herein, electrical energy generated by the motors while operating in the second operational mode can be used to charge batteries of vehicle. In combination with a fuel-burning thruster of the hybrid vehicle, the batteries charged during flight of the vehicle can be used to increase distances over which the vehicle can fly. further, the dual role of the motors in driving the rotors and acting as electrical generators minimizes additional weight carried by the vehicle to charge the batteries.

An example aircraft includes a battery, a rotor coupled to a wing, a motor operatively coupled to the rotor, and a processor operatively coupled to the motor. The processor to is cause the motor to operate in a first motor operational state. The rotor is to operate in a first rotor operational state when the motor is operating in the first motor operational state. The processor is to cause the motor to switch from operating in the first motor operational state to a second motor operational state. The rotor is to operate in a second rotor operational state when the motor is in the second motor operational state. The motor is to provide electrical energy to the battery in the second motor operational state and the rotor is to autorotate in the second rotor operational state.

In some examples, the processor is to cause the motor to adjust a speed of the rotor when the motor is operating in the second motor operational state and the rotor is operating in the second rotor operational state. In some such examples, the rotor is a fixed pitch rotor.

In some examples, the rotor is a variable pitch rotor and the processor is to adjust a pitch of the rotor when the rotor is operating in the first rotor operational state or the second rotor operational state.

In some examples, the motor is a first motor, the rotor is a first rotor, and the aircraft further includes a second rotor coupled to the wing and a second motor operatively coupled to the second rotor. In such examples, the processor is to cause the second motor to operate in the second motor operational state and the second rotor to operate in the second rotor operational state when the first rotor is operating in the second rotor operational state.

In some such examples, the aircraft further includes a thruster disposed between the first rotor and the second rotor, the thruster, the first motor, and the second motor to adjust a yaw of the aircraft during flight.

In some such examples, the wing is a first wing and the aircraft further includes a second wing, the second rotor coupled to the second wing, and the thruster is disposed between the first wing and the second wing.

In some examples, the rotor is a first rotor and the wing is a first wing and the aircraft further includes a second rotor coupled to the first wing, a second wing, a third rotor coupled to the second wing, and a fourth rotor coupled to the second wing.

In some examples, the motor is to operate in the second motor operational state when the aircraft is in a cruise stage of flight.

Another example aircraft includes a first rotor coupled to a first wing of the aircraft. The first rotor is to autorotate during flight of the aircraft. The example aircraft includes a first motor operatively coupled to the first rotor. The example aircraft includes a second rotor coupled to a second wing of the aircraft. The second rotor is to autorotate during flight of the aircraft. The example aircraft includes a second motor operatively coupled to the second rotor. The example aircraft includes a rotor operation manager to cause the first motor to electrically control a rotational speed of the first rotor when the first rotor is autorotating and cause the second motor to electrically control a rotational speed of the second rotor when the second rotor is autorotating.

In some examples, the aircraft further includes a thruster disposed between the first wing and the second wing.

In some examples, the rotor operation manager is to control one or more of a pitch or a yaw of the aircraft.

In some examples, the first rotor and the second rotor are to autorotate during a cruise stage of the flight of the aircraft.

In some examples, the first motor is to operate as a generator when the first motor is to electrically control the rotational speed of the first rotor.

Another example aircraft includes a first rotor, a second rotor, means for providing thrust, and first means for generating power. The first means for generating power is to selectively control a rotational speed of the first rotor. The example aircraft includes second means for generating power. The second means for generating power is to selectively control a rotational speed of the second rotor. The means for providing thrust, the first means for generating power, and the second means for generating power are to adjust rotation of the aircraft relative to one or more axes.

In some examples, the aircraft further includes a first wing and a second wing. The first rotor is coupled to the first wing and the second rotor is coupled to the second wing.

In some examples, the means for providing thrust is disposed between the first wing and the second wing.

In some examples, the first rotor is to autorotate during flight of the aircraft. The first means for generating power is to selectively control the rotational speed of the first rotor while the first rotor is autorotating.

In some examples, the first means for generating power is a motor operatively coupled to the first rotor.

In some examples, the aircraft further includes means for controlling a pitch angle of a blade of the first rotor.

Another example aircraft includes a frame including a wing, a battery carried by the frame, a rotor coupled to the wing, a motor operatively coupled to the rotor, and a processor operatively coupled to the motor. The processor is to cause the motor to cause rotation of the rotor during first time period of flight of the aircraft and cause the motor to one of free spin or provide electrical energy to the battery during a second time period of flight of the aircraft different from the first time period.

In some examples, the motor is to free spin during the second time period and the processor is to cause the motor to provide electrical energy to the battery during a third time period.

In some examples, the rotor is to autorotate during the first time period.

In some examples, the rotor is a variable pitch rotor. The processor is to adjust a pitch of the rotor during one or more of the first time period or the second time period.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An aircraft comprising:
   a frame including a wing;
   a battery carried by the frame;
   a thruster coupled to the frame;
   a rotor coupled to the wing;
   a motor operatively coupled to the rotor; and
   a processor operatively coupled to the motor, the processor to:
     cause the motor to operate in a first motor operational state, the rotor to operate in a first rotor operational state when the motor is operating in the first motor operational state, the motor to drive rotation of the rotor in the first motor operational state;
     cause the motor to operate in a second motor operational state, the rotor to operate in a second rotor operational state when the motor is operating in the second motor operational state, the motor to refrain from driving rotation of the rotor in the second motor operational state, the motor to provide electrical energy to the battery in the second motor operational state, the rotor to autorotate in the second rotor operational state during flight of the aircraft;
     cause the motor to operate in a third motor operational state at a time during which the motor is switching from the first motor operational state to the second motor operational state, the rotor to autorotate when the motor is operating in the third motor operational state, the motor to refrain from applying torque in the third motor operational state;
     determine that one or more of a yaw, a pitch, or a roll of the aircraft is to be adjusted during flight of the aircraft; and
     in response to the determination,
       cause the motor to switch from operating in the third motor operational state to the second motor operational state during flight of the aircraft; and
       cause the one or more of the yaw, the pitch, or the roll of the aircraft to be adjusted based on a thrust generated by the thruster when the motor is operating in the second motor operational state.

2. The aircraft of claim 1, wherein the processor is to cause the motor to adjust a speed of the rotor when the motor is operating in the second motor operational state and the rotor is operating in the second rotor operational state.

3. The aircraft of claim 2, wherein the rotor is a fixed pitch rotor.

4. The aircraft of claim 1, wherein the rotor is a variable pitch rotor, the processor to cause the pitch of the rotor to be adjusted when the rotor is operating in the first rotor operational state or the second rotor operational state.

5. The aircraft of claim 1, wherein the motor is a first motor, the rotor is a first rotor, and the aircraft further includes a second rotor and a second motor operatively coupled to the second rotor, the processor to cause the second motor to operate in the second motor operational state and the second rotor to operate in the second rotor operational state when the first rotor is operating in the second rotor operational state.

6. The aircraft of claim 5, wherein the thruster is disposed between the first rotor and the second rotor.

7. The aircraft of claim 6, wherein the wing is a first wing and further including a second wing, the second rotor coupled to the second wing, and wherein the thruster is disposed between the first wing and the second wing.

8. The aircraft of claim 1, wherein the rotor is a first rotor and the wing is a first wing and further including:
   a second rotor coupled to the first wing;
   a second wing;
   a third rotor coupled to the second wing; and
   a fourth rotor coupled to the second wing.

9. The aircraft of claim 1, wherein the motor is to operate in the second motor operational state when the aircraft is in a cruise stage of flight.

10. The aircraft of claim 1, wherein the processor is to cause the pitch of the rotor to be adjusted when the motor is operating in the third motor operational state.

11. An aircraft comprising:
    a first rotor coupled to a first wing of the aircraft, the first rotor to autorotate during flight of the aircraft;
    a first motor operatively coupled to the first rotor, the first motor to refrain from driving rotation of the first rotor when the first rotor is autorotating;
    a second rotor coupled to a second wing of the aircraft, the second rotor to autorotate during flight of the aircraft;
    a second motor operatively coupled to the second rotor;
    a thruster disposed between the first wing and the second wing; and
    a rotor operation manager to:
      cause the first motor to switch between (a) electrically controlling a rotational speed of the first rotor when the first rotor is autorotating and (b) refraining from controlling the rotational speed of the first rotor when the first rotor is autorotating based on movement of the aircraft relative to one or more axes of rotation during flight;
      cause the second motor to switch between (a) electrically controlling a rotational speed of the second rotor when the second rotor is autorotating and (b) refraining from controlling the rotational speed of the second rotor when the second rotor is autorotating;
      cause movement of the aircraft relative to the one or more axes of rotation to be adjusted based on a thrust generated by the thruster when at least one of (a) the first motor is electrically controlling the rotational speed of the first rotor when the first rotor is autorotating or (b) the second motor is electrically controlling the rotational speed of the second rotor when the second rotor is autorotating; and cause the first motor and the second motor to refrain from applying torque when switching between (a) electrically controlling the rotational speed of the first rotor and the second rotor when the first rotor and the second rotor are autorotating and (b) refraining from controlling the rotational speed of the first rotor and the second rotor.

12. The aircraft of claim 11, wherein the rotor operation manager is to control one or more of a pitch or a yaw of the aircraft.

13. The aircraft of claim 11, wherein the first rotor and the second rotor are to autorotate during a cruise stage of the flight of the aircraft.

14. The aircraft of claim 11, wherein the first motor is to operate as a generator when the first motor is electrically controlling the rotational speed of the first rotor.

15. The aircraft of claim 11, wherein the rotor operation manager is to cause a pitch of the first rotor to be adjusted when the first motor is refraining from controlling the rotational speed of the first rotor.

16. An aircraft comprising:
a first rotor and a second rotor;
means for providing thrust;
first means for generating power, the first power generating means to transition between (a) a first state in which the first power generating means is to drive rotation of the first rotor to control a rotational speed of the first rotor, (b) a second state in which the first power generating means is to refrain from controlling the rotational speed of the first rotor when the first rotor is autorotating during flight of the aircraft, and (c) a third state in which the first power generating means is to increase drag on the first rotor to control the rotational speed of the first rotor when the first rotor is autorotating, the first power generating means to refrain from driving the rotation of the first rotor when the first power generating means is in the third state, the first means for generating power to operate in the third state when transitioning from the first state to the second state; and
second means for generating power, the second power generating means to control a rotational speed of the second rotor,
the thrust providing means, the first power generating means, and the second power generating means to adjust rotation of the aircraft relative to one or more axes based on a thrust generated by the thrust providing means when the first power generating means has transitioned from the second state to the third state.

17. The aircraft of claim 16, further including a first wing and a second wing, the first rotor coupled to the first wing and the second rotor coupled to the second wing.

18. The aircraft of claim 17, wherein the thrust providing means is disposed between the first wing and the second wing.

19. The aircraft of claim 16, wherein the first power generating means is a motor operatively coupled to the first rotor.

20. The aircraft of claim 16, further including means for controlling a pitch angle of a blade of the first rotor.

21. An aircraft comprising:
a frame including a wing;
a battery carried by the frame;
a rotor coupled to the wing;
a motor operatively coupled to the rotor;
a thruster coupled to the frame; and
a processor operatively coupled to the motor, the processor to:
cause the motor to drive rotation of the rotor during a first time period of flight of the aircraft; and
cause the motor to switch from driving rotation of the rotor during the first time period to free spinning during a second time period of flight of the aircraft, the second time period different from the first time period;
cause the motor to switch from free spinning during the second time period to providing electrical energy to the battery during a third time period of flight of the aircraft, the motor to refrain from driving rotation of the rotor during the third time period, the third time period different from the first time period and the second time period; and
cause movement of the aircraft with respect to a yaw axis, a pitch axis, or a roll axis to be adjusted based on a thrust generated by the thruster when the motor is refraining from driving rotation of the rotor during the third time period.

22. The aircraft of claim 21, wherein the rotor is to autorotate during the second time period.

23. The aircraft of claim 21, wherein the rotor is a variable pitch rotor, the processor to cause a pitch of the rotor to be adjusted during one or more of the first time period, the second time period, or the third time period.

* * * * *